United States Patent [19]
Hoffert et al.

[11] Patent Number: 5,894,480
[45] Date of Patent: Apr. 13, 1999

[54] METHOD AND APPARATUS FOR OPERATING A MULTICAST SYSTEM ON AN UNRELIABLE NETWORK

[75] Inventors: Eric M. Hoffert, San Francisco; Mark A. Green, Albany, both of Calif.

[73] Assignee: Apple Computer, Inc., Cupertino, Calif.

[21] Appl. No.: 08/946,892

[22] Filed: Oct. 8, 1997

Related U.S. Application Data

[63] Continuation of application No. 08/609,941, Feb. 29, 1996, abandoned.
[51] Int. Cl.[6] .................... H04J 3/12; H04L 12/56; H04N 7/08
[52] U.S. Cl. .................. 370/389; 370/432; 370/473; 370/489; 370/522; 348/474
[58] Field of Search ............... 370/6, 60.1, 94.1, 370/94.2, 94.3, 110.1, 119, 389, 390, 432, 473, 474, 475, 486, 487, 489, 490, 498, 522, 528; 348/6, 7, 10, 12, 429, 460, 461, 462, 467, 473, 474, 522, 555; 380/10, 14, 20; 340/825.07, 825.3

[56] References Cited

U.S. PATENT DOCUMENTS

| 4,517,561 | 5/1985 | Burke et al. ............ 340/825.07 |
| 5,289,276 | 2/1994 | Siracusa et al. ............ 348/467 |
| 5,319,707 | 6/1994 | Wasilewski et al. ............ 380/14 |
| 5,570,126 | 10/1996 | Blahut et al. ............ 348/7 |
| 5,583,562 | 12/1996 | Birch et al. ............ 348/12 |

*Primary Examiner*—Hassan Kizou
*Attorney, Agent, or Firm*—Carr & Ferrell, LLP

[57] ABSTRACT

A multicast network system comprises a data network which provides a medium for data transfer. A media source having a control packet and media packets coupled to the data network broadcasts the control packet and the media packets to the data network and rebroadcasts the control packet in conjunction with the media packets to the data network. A media receiver is coupled to the network and receives the control packet and the media packets from the data network to process the control packet and the media packets to produce a media output.

12 Claims, 6 Drawing Sheets

METHOD AND APPARATUS FOR OPERATING A MULTICAST SYSTEM ON AN UNRELIABLE NETWORK

RELATED APPLICATIONS

This is a continuation of application Ser. No. 08/609,941 filed on Feb. 29, 1996, abandoned.

BACKGROUND OF THE INVENTION

1. Field of the Invention

This invention relates to data transfers between devices on a high speed digital network, and more particularly to a system and method for receiving an audio/visual multicast source on a high speed local or wide area packet network.

2. Description of the Background Art

In recent years, digital video data transmission over a local area network (LAN) has become more common. Before analog video data is transferred onto the LAN, analog video is converted to digital format. Available accessory hardware and software receive broadcast video programming and convert the analog video into digital format. Other hardware and software compress the digital format to digital video data that can be efficiently transferred to a personal computer or data network. Analog video data includes video programming material that is broadcast live, current programming broadcast on a television network, or pre-recorded programming. Often times, many devices monitor the transmission of the video programming that is broadcast onto the LAN.

In order to transmit digital video data over a data network, an effective transfer scheme for sending and retrieving the video data is required for the data network. Most data networks support three basic transfer schemes: a unicast addressing scheme where data is sent to one unique device on the data network, a broadcast addressing scheme where data is sent to all devices on the data network, and a multicast addressing scheme where data is sent to a group of devices on the data network. Each type of addressing scheme has characteristics that are both desirable and undesirable.

The unicast addressing scheme works well in a network system where only one output device receives the digital data from the data network. If there is a requirement that multiple output devices receive the digital data, then the source device has to retransmit the digital data for each additional output device. As the number of additional output devices increases, the data network quickly becomes overloaded and congested.

The broadcast addressing scheme permits multiple output devices to receive the digital data without requiring the source device to transmit multiple sets of digital data. However, the broadcast digital data is also transmitted to devices that are not interested in the digital data These devices have to receive the digital data and reject it. Thus, the broadcast of digital data onto the data network affects other devices on the data network. The problem is compounded when routers or network bridges are required to broadcast the digital data needlessly to neighboring data networks.

The multicast addressing scheme enables the transmission of digital data to be received by a select group of output devices on the data network system. Digital data is only received by the output devices that are interested in receiving the digital data. Available network adapters provide high speed filtering of multicast addresses for high performance rejection/selection of multicast addresses. Thus, a multicast addressing scheme is suitable for the selective transmission of digital data. However, the multicast addressing scheme has drawbacks when the scheme is used to transmit digital video programming.

Audio and video digital data converted for transfer on the data network include descriptive control information that has to be received by the receiving output device before the digital video data can be processed for output. In a unicast addressing scheme, the receiving output device can acknowledge the receipt of the descriptive control information before the source device proceeds to transmit the digital video data. In a multicast addressing scheme on an unreliable or lossy network, the source device does not receive acknowledgment signals from receiving output devices. The source device transmits digital video data onto the data network without regard to whether receiving output devices can receive and process the digital video data. Therefore, it is desirable to design a data network for receiving digital video data from a multicast addressing scheme that provides efficient transfer of digital video data which improves and overcomes the disadvantages of the prior art. The improved multicast addressing scheme should permit receiving devices to tap into and receive the multicast digital video data on the data network.

SUMMARY OF THE INVENTION

In accordance with the present invention, a multicast network system comprises a data network which provides a medium for data transfer. A media source having a control packet and media packets coupled to the data network, broadcasts the control packet and the media packets to the data network and rebroadcasts the control packet in conjunction with the media packets to the data network. A media receiver is coupled to the network and receives the control packet and the media packets from the data network to process the control packet and the media packets to produce a media output. The media receiver filters rebroadcasts of the control packet after successful processing of the control packet. The control packet includes format information pertaining to the media packets so that the media packets can be processed by the media receiver to produce the media output. The media packets include audio information and video information which are processed by the media receiver to produce the media output. The control packet is rebroadcast at a fixed time interval from a previous broadcast of the control packet.

A media receiver can tap onto the data network and begin receiving the media information. By rebroadcasting the control packet onto the data network, a media receiver can retrieve the control packet and obtain the format information. Once the format information is received, the media receiver can begin processing the media packets. The media packets can be stored for later output or be used to provide the media output. The control packets are typically on the order of 500 to 2000 bytes/sec while the media packets are typically on the order of 100 to 200 Kbytes/sec. The ratio of control packets to media data is approximately 100 to 1. Thus, rebroadcasting the control packet onto the data network does not impact the throughput rate of the media packets. Additional media receivers can tap into the network and be assured of promptly receiving the important format information.

According to another aspect of the invention, the media source broadcasts a second control packet which changes format information pertaining to the media packets broadcast by the media source. The media receiver completes processing of the second control packet before processing the media packets from the data network. As the format information of the media packets changes, the second control packet corresponding to the new format information is broadcast onto the data network.

A second media receiver in another aspect of the invention is coupled to the data network which processes the control packet and the media packets broadcast by the media source to produce a second media output. The second media receiver completes processing of the control packet before processing the media packets from the data network. Rebroadcasting of the control packets permits additional media receivers to tap onto or "tune in" to the data network and retrieve the format information from the control packets. Once the format information is retrieved, any additional media receiver can begin processing the media packets.

The present invention can also be characterized as a method of operating a multicast network comprising the steps of generating a control packet which includes format information, transferring media packets which include media information, broadcasting the control packet and the media packets to the multicast network, and rebroadcasting the control packet in conjunction with the media packets. The method further comprises the step of broadcasting the control packet and the media packets on an unreliable network. The method further comprises the step of receiving the control packet and the media packets, and processing the control packet and the media packets to produce a media output.

The format information pertains to the media packets and the method further comprises the step of processing the format information before processing the media packets. The method further comprises the step of ignoring the media packets until the format information is processed. The format information includes open channel information and open stream information and the method further comprises the step of generating an array of the open channel information and the open stream information.

According to another aspect of the invention, the step of processing the format information includes the step of receiving the open channel information and the open stream information from the multicast network, and building the array of the open channel information and the open stream information. The method further comprises the step of generating a second control packet which includes second format information, transferring media packets which conform to the second format information, broadcasting the second control packet and the media packets to the multicast network, and rebroadcasting the second control packet in conjunction with the media packets. The method further comprises the step of receiving the second control packet and the media packets, and processing the second control packet and the media packets to produce a second media output.

The present invention can further be characterized as a media device coupled to a network comprising a receiver having a data format memory which receives rebroadcasts of a control packet having data format information for storage to the data format memory. A data processor coupled to the receiver receives the data format information so that media packets having media information can be processed by the data processor. An output coupled to the data processor receives the media information from the data processor to provide a media output. The media device further comprises a storage device which stores the media information from the data processor for media output at a later time.

According to another aspect of the invention, the control packet includes description data pertaining to the media packets on the network. The receiver completes processing the control packet to obtain the description data pertaining to the media packets so that the data processor can process the media packets to produce the media output. The receiver receives rebroadcasts of a second control packet having second data format information for storage to the data format memory. The receiver ignores processing of the media packets until the second data format information is stored in the data format memory.

Other aspects and advantages of the present invention can be seen upon review of the Figures, the Detailed Description and the Claims which follow.

DESCRIPTION OF THE PREFERRED EMBODIMENT

Figure 1:
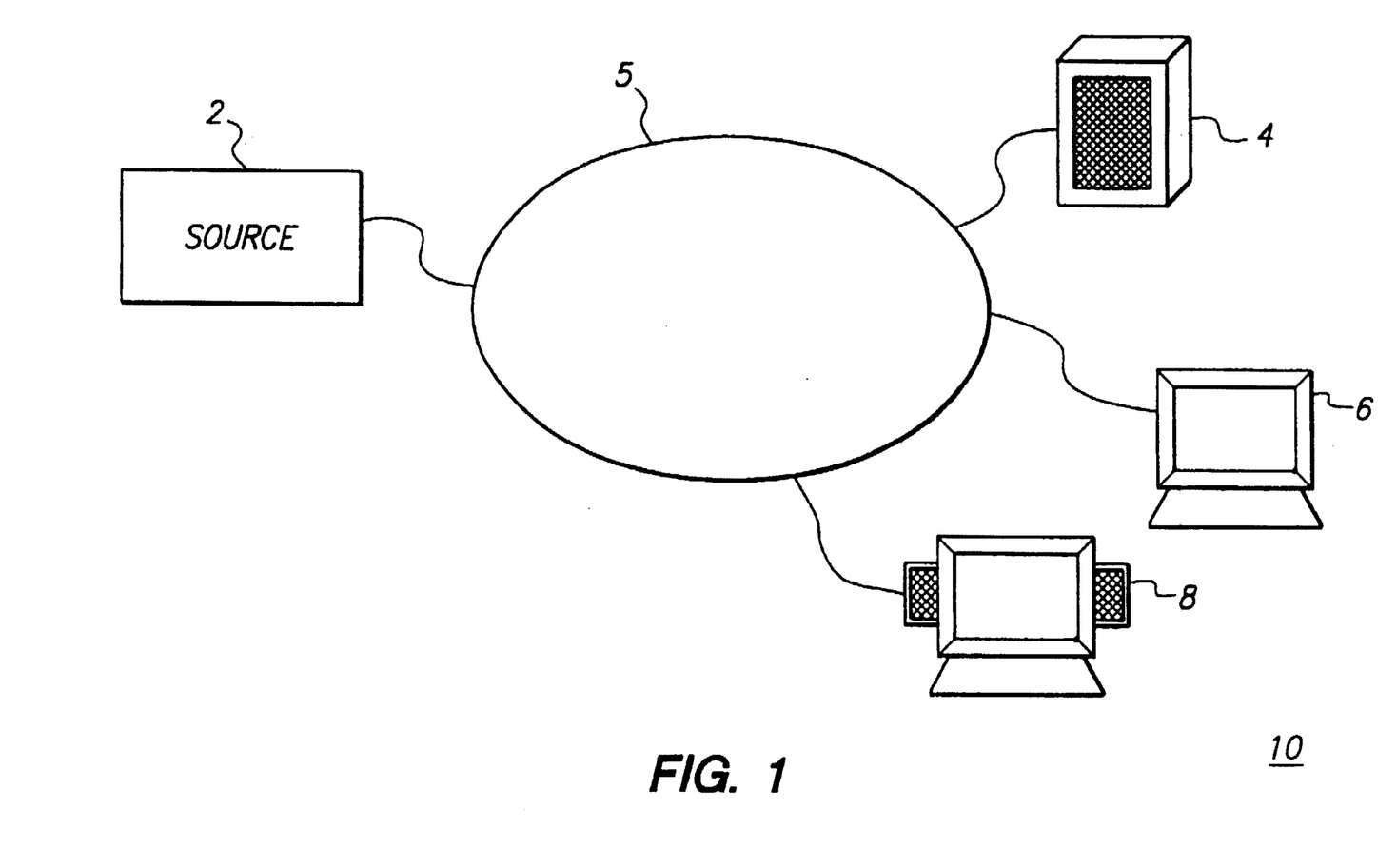
FIG. 1 depicts a multicast network system of the present invention.

FIG. 1 is an embodiment of the present invention depicting a multicast network system 10. A multicast network system 10 provides continuous broadcasts of media information on network 5. Network 5 can be a conventional AppleTalk, TCP/IP, ATM, IPX, or other similar network. A media source 2 is coupled to the network 5 and provides the continuous broadcasts of media information. The media information includes multimedia information from a camcorder, laser disc player, or other audio/video device. The media source 2 provides simultaneous or recorded broadcasts of media information onto network 5. Receiving audio device 4 is coupled to the network 5 and taps audio information from the network 5. Receiving audio device 4 can be a conventional desktop computer or portable computer that is configured to receive audio information. Receiving audio device 4 processes the audio information to provide an audio output at audio device 4. The receiving audio device 4 can store the audio information for playback at a later time. Receiving video device 6 is coupled to the network 5 and taps video information from the network 5. Receiving video device 6 can be another conventional desktop computer or portable computer that is configured to receive video information. Receiving video device 6 processes the video information to provide a video output at video device 6. The receiving video device 6 can store the video information for playback at a later time. Receiving audio/video device 8 is also coupled to the network 5 and taps audio and video information from the network 5. Receiving audio/video device 8 can be a multimedia computer or portable multimedia computer (also referred to as a "data processor") that is configured to receive audio and video information. Receiving audio/video device 8 processes the audio and video information to provide an audio and video output at audio/video device 8. The receiving audio/video device 8 can store the audio and video information for playback at a later time. Receiving devices 4, 6 and 8 are referred to collectively as receivers.

In order to maintain high speed transmissions, network 5 is an unreliable network. A receiving device coupled to the network 5 does not send an acknowledgment of receipt when the receiving device successfully receives transmitted data. Media source 2 broadcasts media information onto network 5 without receiving an acknowledgment of receipt from a receiving device. If a receiving device requires access to the media information, the receiving device can tap into or "tune in" to network 5 during the transmission of media source 2. For example, receiving audio/video device 8 can tap into network 5 and begin receiving media information from the network 5. The receiving audio/video device 8 receives the media information and processes the media information for output. Other receiving audio devices 4, video devices 6 or audio/video devices 8 can tap into the network 5 and begin receiving and processing the media information for output or storage.

Segments of digital data transferred using an unreliable network are often lost during transmission. When transferring media information, certain segments of the media information are imperative to the transmission and cannot be lost. The media information that is transferred on the network 5 includes audio/video data. The audio data is transferred in packets of audio samples and the video data is transferred in packets of video frames. Media source 2 transfers the packets of video frames and audio samples onto the network 5 in data streams. Before the data streams of video frames and audio samples can be received, a control packet having format information pertaining to the video frames and the audio samples has to be received. If the data includes audio frames, the format information comprises compression, sampling rate, bits per sample, stereo/mono, and other data pertaining to the audio frames. If the data includes video frames, the format information comprises compression, spatial resolution, pixel depth, quality level and other data pertaining to the video frames. To ensure that the control packet is received by a receiving audio device 4, video device 6, or audio/video device 8, the control packet is rebroadcast onto the network at certain predetermined time intervals. Rebroadcasting also ensures that receiving devices 4, 6, and 8 can tap into or "tune in" to the network 5 and begin processing the media information when the transmission of the media information is in progress.

Figure 2A:
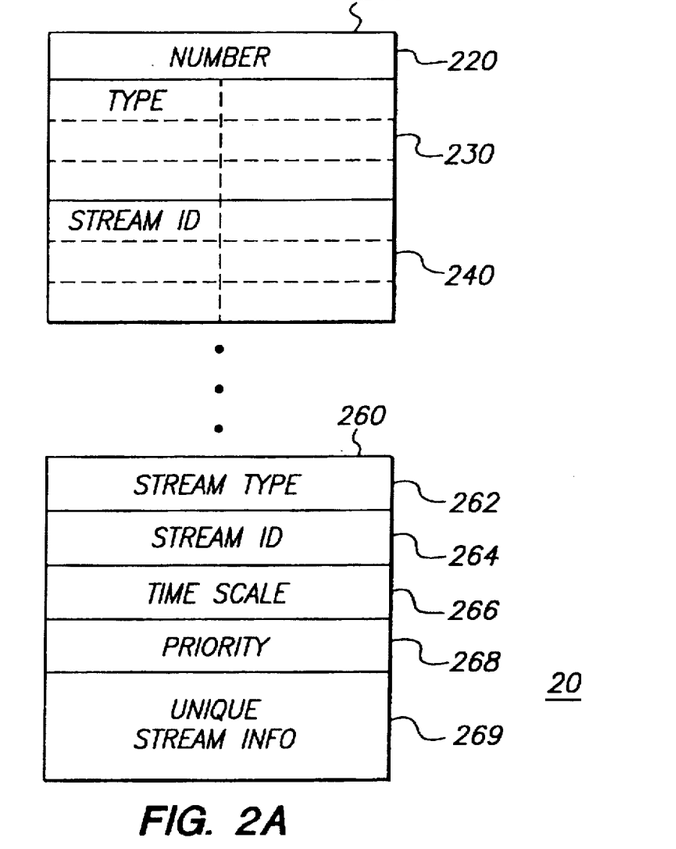
FIG. 2a depicts an exemplary block diagram of a control packet of the present invention having format information.

Referring now to FIG. 2a, a block diagram of a control packet 20 having format information is shown. The control packet 20 includes an open channel section 210 and an open stream section 260. The open channel section 210 includes message information about the format of the data streams that are currently being broadcast on the network 5. Number block 220 of open channel section 210 provides information on how many different data streams are to be received from the network 5. Type block 230 is an array that provides information about the type of each stream. For example, the type of the stream may be video or audio. Stream ID block 240 is an array that provides a stream identifier for each stream. The stream identifier is a unique number for identifying a particular stream.

The open stream section 260 provides information about a particular stream in the data stream. Stream type block 262 of the open stream section 260 provides information about the type of the particular stream. The type of the stream may be video or audio. Stream ID block 264 provides the unique number identifying the particular stream. Time scale block 266 provides information about the rate at which the stream is being transferred. The time scale block 266 provides the number of units per second for the particular stream. Priority block 268 provides information about the importance of the particular stream as compared to other streams which correspond to the particular open channel section 210.

The open stream section 260 of control packet 20 further provides a block having unique stream information 269. Depending on the particular type of the stream, certain unique stream information 269 pertaining to the particular stream is provided. If the particular open stream section 260 describes a video stream message, the unique stream information 269 includes data pertaining to data compression, spatial resolution, pixel depth, temporal compression or quality level of the particular video stream. Receiving devices use the unique stream information 269 to process the particular stream for output or storage. The unique stream information 269 includes additional open stream information that is unique to the particular type of the stream. The additional open stream information 269 varies depending on the particular type of the stream. For instance, if instead the particular open stream describes an audio stream, the unique stream information 269 includes data pertaining to data compression, sample rate, bits per sample, stereo or mono of the particular audio stream. The unique stream information 269 for the video stream is different compared to the unique stream information 269 for the audio stream.

Figure 2B:
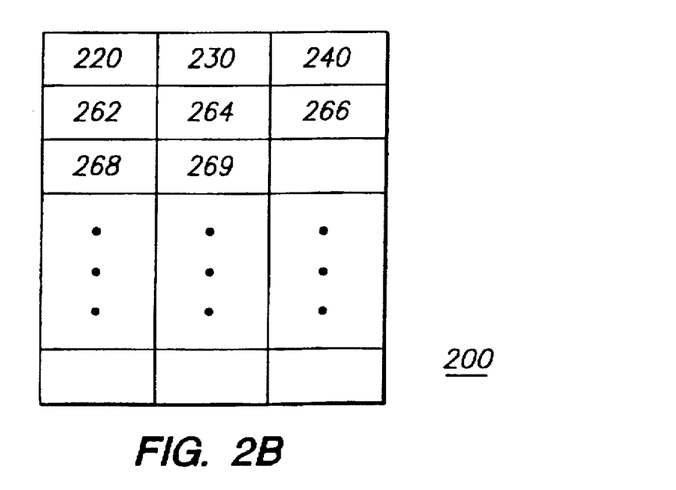
FIG. 2b depicts an exemplary block diagram of a message array for storing control packet information.

Referring now to FIG. 2b, a message array 200 is generated to organize the format information from the control packet 20 of FIG. 2a. Media source 2 generates the message array 200. Whenever media source 2 rebroadcasts the control packet 20, the message array 200 is accessed and transferred onto the network 5. Entry 220 in message array 200 corresponds to number block 220 of the open channel section 210. Similarly, entries 230, 240, 262, 264, 266, 268, and 269 correspond to type 230, stream ID 240, stream type 262, stream ID 264, time scale 266, priority 268, and unique stream information 269 of the control packet 20 of FIG. 2a. The receiving audio device 4, video device 6, and audio/video device 8 generate similar message arrays 200 for receiving the format information for the control packet 20.

Figure 3:
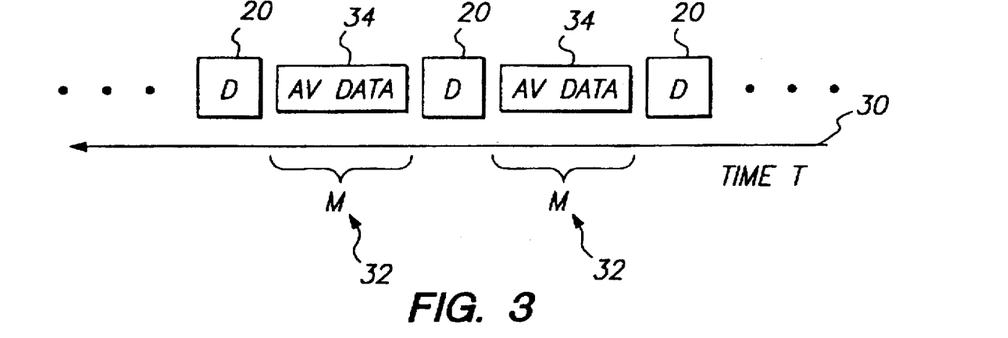
FIG. 3 is a time line depicting media information transferred on the multicast network system.

FIG. 3 is a section of a time line 30 illustrating the temporal transmission of media information on the network 5. Control packet 20 is rebroadcast at each time interval M 32. Between time intervals M 32, AV data 34 is transferred on the network 5. Media source 2 transfers AV data 34 onto the network 5 for receipt by receiving devices 4, 6, and 8. Before a receiving device 4, 6, or 8 receives and processes the AV data 34, the receiving device 4, 6, or 8 receives format information included in control packet 20. Similarly, if a receiving device 4, 6, or 8 taps onto the network 5, the receiving device 4, 6, or 8 receives format information included in control packet 20 before the receiving device 4, 6, or 8 receives and processes the AV data 34. Rebroadcasting the control packet 20 at time intervals M 32 assures a receiving device 4, 6, or 8 receives the control packet 20. Once the format information included in the control packet 20 is received, the receiving device 4, 6, or 8 receives and processes the AV data 34 for output or stores the AV data 34 for later output. The control packets 20 are typically on the order of 500 to 2000 bytes/sec while the packets of AV data 34 are typically on the order of 100 to 200 Kbytes/sec. The ratio of control packets 20 to packets of AV data 34 is approximately 100 to 1. Thus, rebroadcasting the control packet onto the data network does not impact the throughput rate of the packets of AV data 34 on network 5.

Figure 4A:
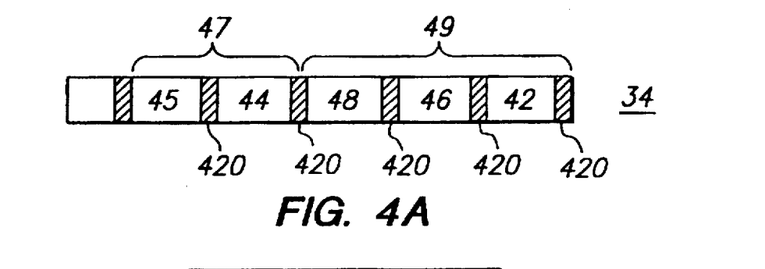
FIG. 4a is an exemplary block diagram of a section of AV data that is transferred on the multicast network system.

FIG. 4a is a block diagram of a section of AV data 34. The AV data 34 includes the packets of media information, which may be video frames 42 and 44 or audio samples 45, 46, and 48. Video frame 42 and audio samples 46 and 48 comprise a media component 49. Similarly, video frame 44 and audio sample 45 comprise a media component 47. Other media components 47 and 49 are formed using combinations of video frames 42 and 44 and audio samples 45, 46, and 48. The audio/video device 8 provides an audio/video output when a complete media component 47 or 49 is received and processed. Incomplete media components 47 and 49 that are received by audio/video device 8 are not processed for output or storage. To determine whether a complete media component 47 or 49 is received, each video frame 42 and 44 and audio sample 45, 46, and 48 is preceded by a datagram 420. Datagrams 420 include format information pertaining to the media component 47 or 49 that is transmitted on the network 5. Some video frames 42 and 44 have multiple datagrams 420. Similarly, audio samples 45, 46, and 48 can have multiple datagrams 420. The number of datagrams 420 is proportional to the size of the media component 47 or 49. Using the datagrams 420, the original media component 47 or 49 sent by media source 2 can be reconstructed by the receiving device 4, 6, or 8.

Figure 4B:
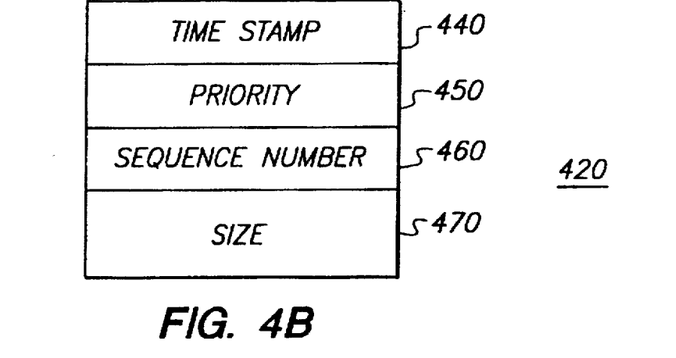
FIG. 4b is an exemplary block diagram of the format information that is included in a datagram.

FIG. 4b is an exemplary block diagram of the format information that is included in a datagram 420. A time stamp section 440 provides information pertaining to when the corresponding section of a media component 47 or 49 was placed on the network 5. When media components 47 and 49 are stored for later playback, the time stamp section 440 facilitates synchronized playback of the stored media components 47 and 49. Priority section 450 provides information pertaining to the importance of the corresponding section of the media component 47 or 49. Depending on the priority of a particular media component 47 or 49, some devices coupled to the network 5 may not process the particular media component 47 or 49. Sequence number 460 provides information pertaining to the relative position of a datagram 420 within a video frame 42 or 44, or audio sample 45, 46, or 48. Size section 470 provides information pertaining to the size of the corresponding section of the media component 47 or 49. A receiving device 4, 6, or 8 receives datagrams 420 from the network 5 and determines whether a complete media component 47 or 49 is received. Many factors can cause the loss of a section of media component 47 or 49 by the receiving device 4, 6, or 8. For instance, the network 5 may be congested, or the receiving device 4, 6, or 8 can not process the incoming high bandwidth media information from the network 5. When a section of the media component 47 or 49 is lost, the receiving device 4, 6, or 8 can determine that the received media component 47 or 49 is not complete from another received datagram 420. If the received media component 47 or 49 is not complete, receiving device 4, 6, or 8 does not process the received media component 47 or 49 for output or storage.

Figure 5:
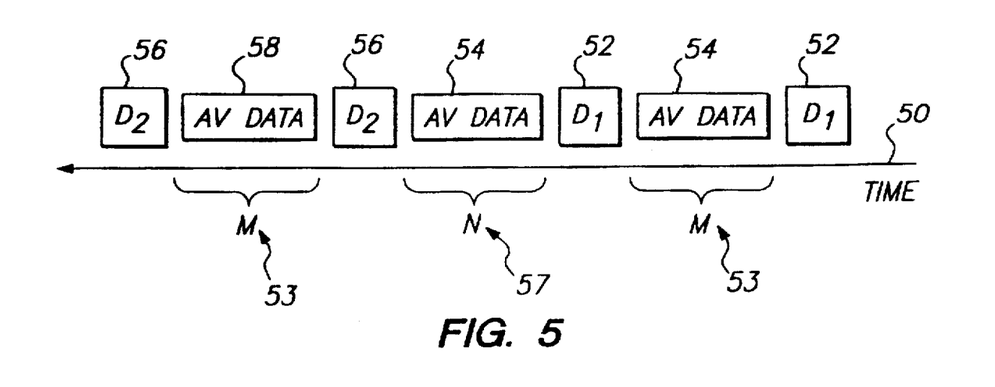
FIG. 5 is a time line depicting media information corresponding to a new control packet transferred on the multicast network system.

FIG. 5 is a section of a time line 50 showing media information on the network 5 as format information supplied by control packet 52 is changed to new format information of control packet 56. Control packet 52 is rebroadcast at the end of each time interval M 53. During time intervals M 53, AV data 54 is transferred on the network 5. Media source 2 transfers AV data 54 conforming to format information of control packet 52 onto the network 5 for receipt by receiving devices 4, 6, and 8. During interval N 57, control packet 52 is changed to control packet 56. Whenever media source 2 receives a new control packet 56, the new control packet 56 is transferred onto the network 5 without delay. The new control packet 56 changes the format of the AV data 54 on the network 5. In FIG. 5, the new control packet 56 is received during time interval N 57 and is transferred onto the network 5 after time interval N 57. Following the transfer of the new control packet 56, new AV data 58 that is transferred onto the network 5 conforms to the format information of new control packet 56. Subsequent rebroadcasts of new control packet 56 revert to the prescribed time intervals M 53. Over the duration of the transfer of AV data 54 on network 5, many new control packets 56 can occur changing the format information of the AV data 54 transferred on the network 5.

Figure 6:
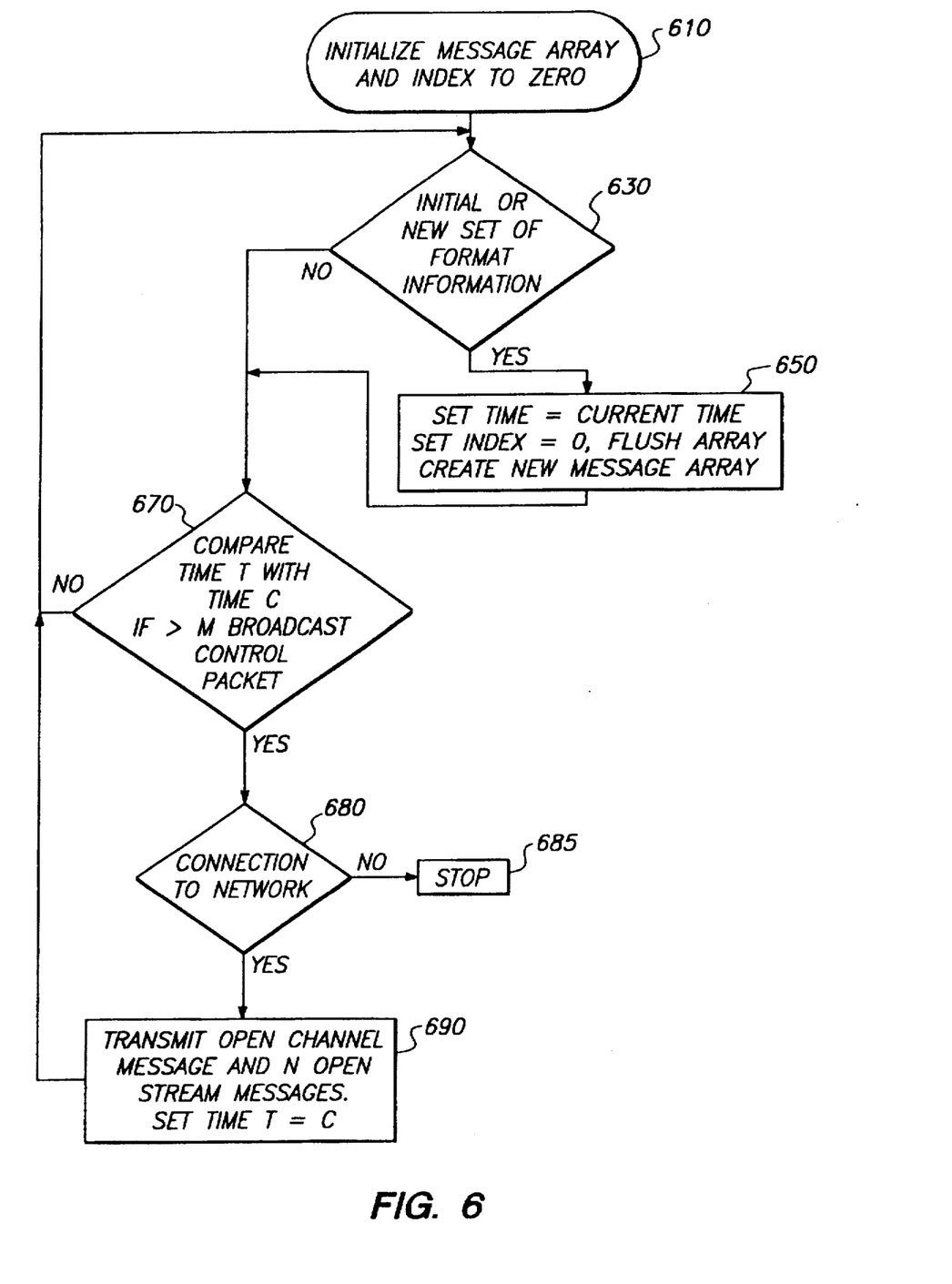
FIG. 6 is a flow diagram of a media source providing a control packet to the multicast network system.

Referring now to FIG. 6, a simplified exemplary flow diagram of media source 2 providing a control packet having format information onto the network is illustrated. The flow diagram begins at start step 610. Media source 2 initializes the index of the control packet message array 200 to zero, and the control packet message array 200 is cleared to contain no entries. The control packet message array 200 includes format information pertaining to the media information that is transferred onto the network 5.

In step 630, if media source 2 receives an initial or new set of format information for transfer onto the network 5, the control packet message array 200 is initialized or replaced with the initial or new set of format information. If an initial or new set of format information is not received, the flow diagram skips to step 670. Skipping to step 670 occurs when the format information of control packet 52 remains unchanged. If the format information is changed, step 650 initializes or replaces the control packet message array 200. A set of open channel information 210 and open stream information 260 are stored into the control packet message array 200 beginning at message index zero. If the set of format information is a new set, the existing format information is flushed and the new format information overwrites the information in the previous control packet message array 200. A set of open channel 210 and N open stream messages is created from the control packet message array 200. Time T is set to clock time C and step 670 is performed.

Step 670 examines the clock time C and compares the time to time T. If the difference between clock time C and time T is greater than M time, and there is a control packet message array 200, the flow diagram advances to step 680. If the difference between clock time C and time T is less than M time, the flow diagram moves back to step 630 to check for a new set of format information before rebroadcasting the control packet message array 200. Time M is the prescribed time for rebroadcasting the control packet message array 200 and is typically set to one second. In step 680, the media source 2 queries the state of the network connection to the network 5. If media source 2 is not coupled to the network 5, stop step 685 is executed. If media source 2 is coupled to the network 5, step 690 is performed. The control packet message array 200 comprising the open channel message 210 and N open stream messages 260 is transferred onto the network 5. Time T is reset to clock time C, and media source 2 is returned to perform step 630 to check for a new set of format information before rebroadcasting the control packet message array 200.

Figure 7:
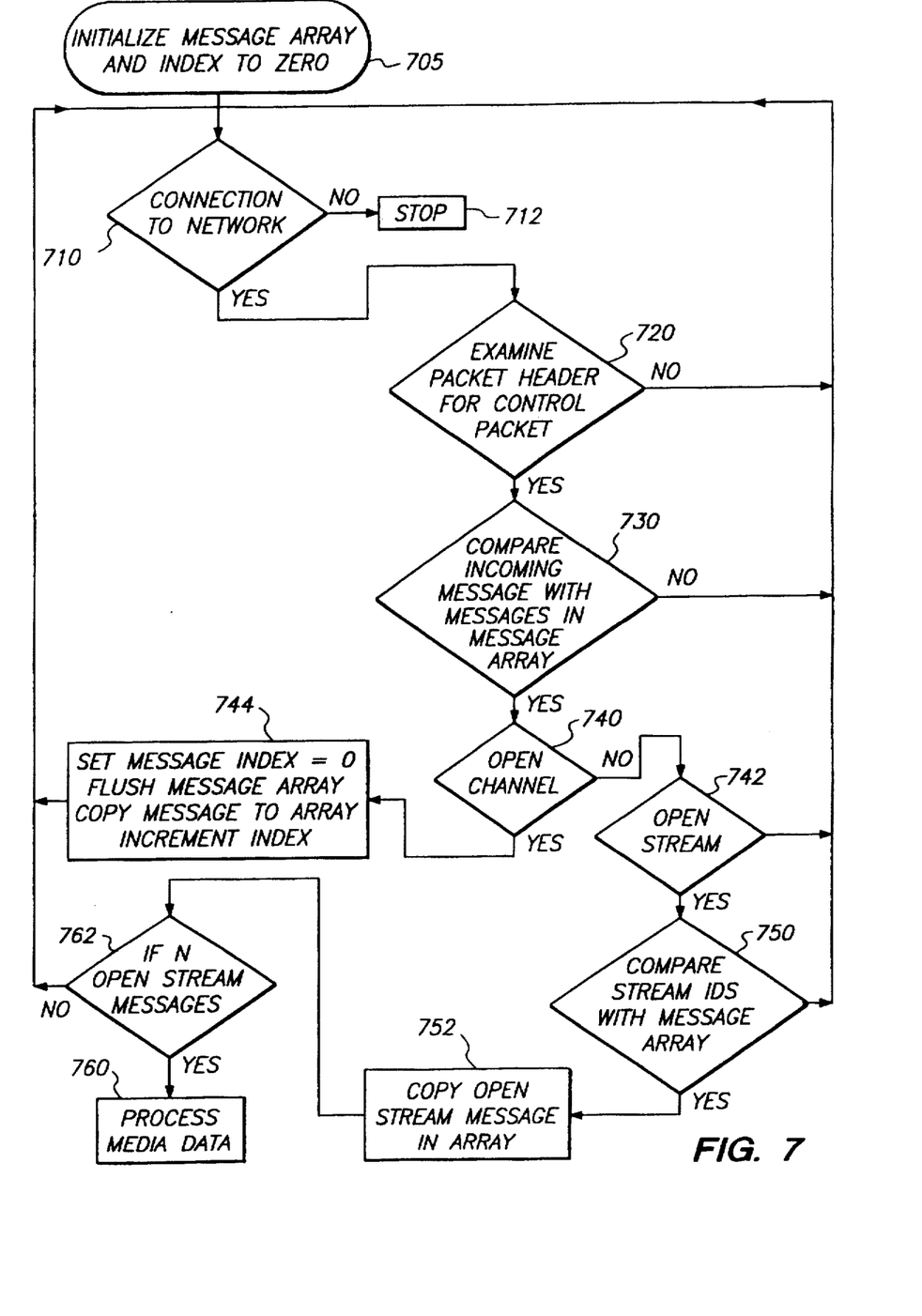
FIG. 7 is a flow diagram of a receiving device receiving format information from a control packet on the multicast network system.

Referring now to FIG. 7, a simplified exemplary flow diagram of a receiving device 4, 6, or 8 receiving format information from a control packet 56 on the network 5 is illustrated. Receiving device 4, 6, or 8 generates a control packet message array 200 based on the information received from a control packet 56. Receiving device 4, 6, or 8 generates the control packet message array 200 before media components 47 and 49 are received for processing. The flow diagram begins at start step 705 by initializing the index of receive message array 200 to zero, and the receive message array 200 is cleared to contain no entries. In step 710, receiving devices 4, 6, and 8 determine whether there is an active connection to the network 5. If there is not an active connection, stop step 712 is performed. If a receiving device 4, 6, or 8 has an active connection to the network 5, the receiving device 4, 6, or 8 performs step 720.

In the present example, assume only receiving device 8 has the active connection to network 5. Receiving device 8 performs step 720 by examining the network packet header of the media information from the network 5. If the network packet header is a media component 47 or 49, the media component 47 or 49 is ignored, and step 710 is performed again until a network packet header having a control packet 56 is received. When the network packet header is a control packet 56, step 730 is performed. In step 730, device 8 performs a byte for byte comparison of the incoming message contents of the control packet 56 with the message contents stored in the receive message array 200 for the control packet 56. The comparison determines whether the received message is already present in the receiving message array 200. If the message is unique or if the message array 200 does not contain entries for the received message, step 740 is performed. A unique message is a message which is currently not in the message array 200. If the message is not unique, receiving device 8 reperforms step 710 to receive additional control packet information.

In step 740, receiving device 8 examines the incoming message to determine if the message is an open channel message 210. An open channel message 210 indicates that a new set of stream formats is provided for the incoming messages. When an open channel message 210 is received, step 744 is performed, and the index of the receive message array 200 is set to zero and all existing messages are flushed from the message array 200 for the control packet 56. The newly received open channel message 210 is copied to the first element of the receive message array 200. The index of the message array 200 is incremented by one and receiving device 8 is set to reperform step 710 to receive additional control packet information to complete the new control packet message array 200.

If step 740 determined that the incoming message is not an open channel message 210, step 742 is performed. Step 742 checks the incoming message to determine whether the incoming message is an open stream message 260. If the incoming message is not an open stream message 260, step 710 is reperformed to receive additional control packet information. When an open stream message 260 is received, step 750 compares the stream ID 264 of the incoming message with the stream IDs 240 that correspond with the currently stored open channel message 210. If the incoming stream ID 264 matches a stream ID 240 of the open channel message 210, a new open stream message 260 is received and is copied to the receive message array 200 in step 752. If the incoming stream ID 264 does not match a stream ID 240 of the open channel 210, the incoming stream ID 264 refers to a previous and now obsolete open channel message 210. The open stream message 260 is ignored and is not copied to the message array 200 for the open channel 210, and step 710 is reperformed to receive additional open stream messages.

When a received open stream message 260 is copied to the receive message array 200 for the open channel 210 in step 752, step 760 determines if N open stream messages 260 have been received in the receive message array 200 for the open channel 210. If N open stream messages 260 have not been received, step 710 is reperformed to receive additional open stream messages 260. When N open stream messages 260 have been received in the receive message array 200 for the open channel 210, receiving device 8 begins receiving and processing the media components 47 or 49 from the network 5 for output or storage in step 762.

Figure 8:
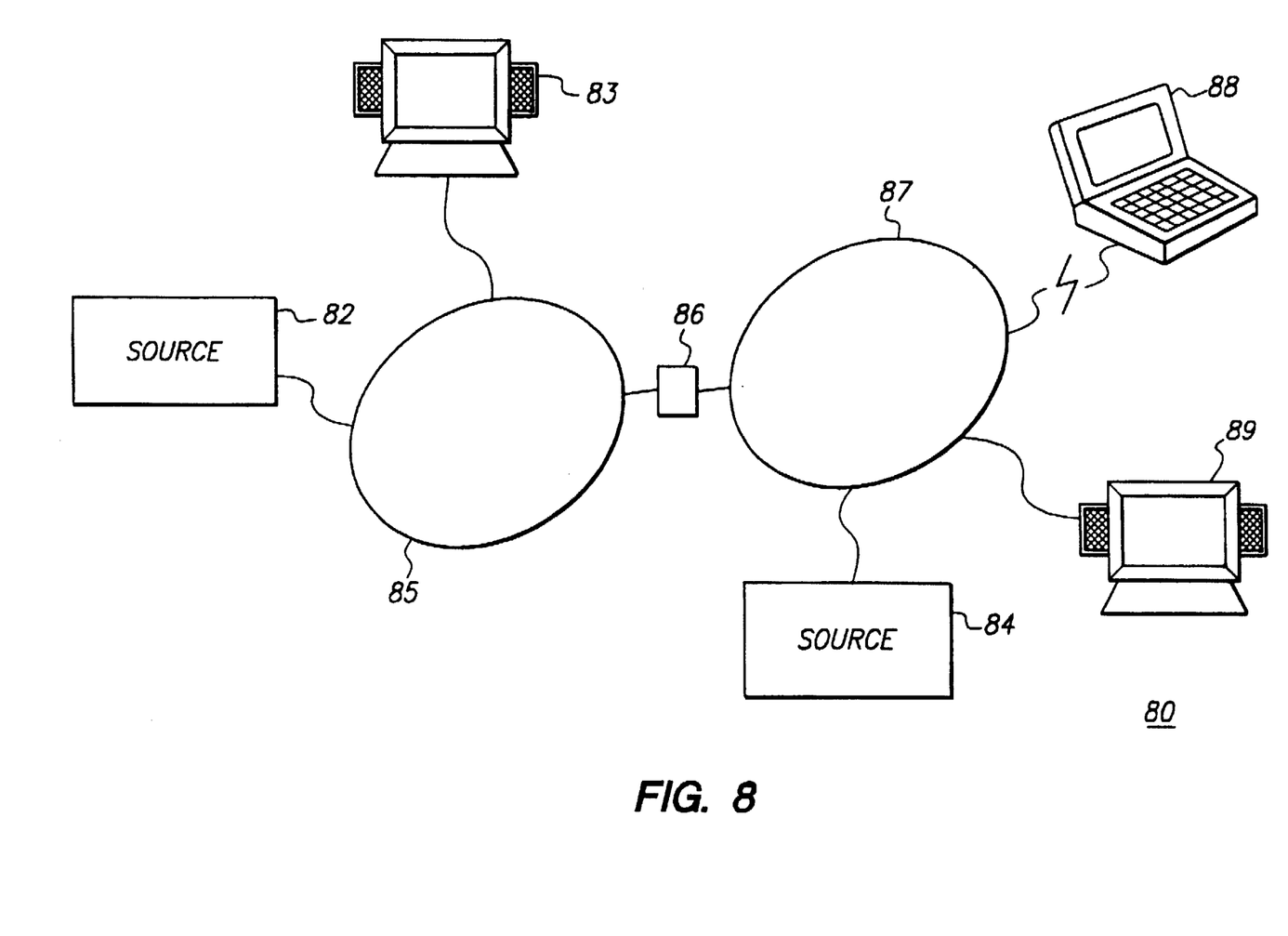
FIG. 8 depicts an embodiment of the present invention in an expanded multicast network system.

FIG. 8 illustrates an embodiment of the present invention as an expanded multicast network system 80. Multiple multicast network systems 10 are combined to form the expanded multicast network system 80. Continuous broadcasts of media information are provided on network 85 and network 87 of multicast network system 80. Network 85 and network 87 are similar to the network 5 of multicast system 10. A media source 82 is coupled to the network 85 and provides the continuous broadcasts of media information on network 85. For example, media source 82 is distributing media information pertaining to a lecture given in a classroom at a university. Network 85 is a university network that receives the broadcast of the lecture from media source 82. A media source 84 is coupled to the network 87 and provides the continuous broadcasts of media information on network 87. Media source 84 is distributing a corporate meeting in a conference room. Network 87 is the corporate network that receives the broadcast of the meeting from media source 84. A router 86 provides an interface to permit the exchange of media information between network 85 and network 87. For instance, output device 83 receives media information from media source 84, which is coupled to network 87. The media information from media source 84 is transferred to network 85 via router 86 for receipt by output device 83. Thus, corporate personnel having access to the university network 85 can access the media information from media source 84 that is broadcast on the corporate network 87. Output device 89 is coupled to network 87 and receives media information from media source 84. In the example, output device 89 can monitor the corporate meeting in another area having access to corporate network 87. Wireless output device 88 has a wireless connection to network 87 for receiving media information from media source 82. Media source 82 provides media information onto network 85 which is transferred to network 87 via router 86 for receipt by wireless output device 88. Thus, corporate personnel having access to the multicast transmission of the lecture from media source 82 can monitor the lecture occurring at the university.

While the present invention has been particularly described with reference to FIGS. 1–8, and with emphasis on multicasting of media information on a network, it should be understood that the Figures are for illustrative purposes and should not be taken as limitations on the invention. In addition, it is clear that the method and apparatus of the present invention have utility in many applications where data transfers to a device on a network are desired. It is contemplated that many changes and modifications may be made by one of ordinary skilled in the art without departing from the spirit and scope of the invention as disclosed.

What is claimed is:

1. A multicast network system comprising:
    a data network which provides a medium for transfer of digital signals; and a media source providing to the data network
   a media packet, and
   a control packet including format information that enables processing of the media packet, wherein said control packet is repeatedly transmitted in conjunction with said media packet.

2. The multicast network system of claim 1, wherein the data network carries a control packet preceding each media packet on the data network.

3. The multicast network system of claim 1, wherein the media packet includes audio samples and video frames which are to be processed to produce a media output signal.

4. The multicast network system of claim 3 wherein the media packet includes datagrams which provide the format information pertaining to the audio samples and the video frames.

5. The multicast network system of claim 4, further comprising:
   a media receiver coupled to the data network, wherein the media receiver processes the received datagrams to determine if the audio samples and the video frames can be used by the media receiver to produce the media output signal.

6. The multicast network system of claim 5, further comprising a second media receiver coupled to the data network which processes the control packet and the media packet broadcast by the media source to produce a second media output signal.

7. The multicast network system of claim 6, wherein the second media receiver completes processing the control packet before processing the media packet from the data network.

8. The multicast network system of claim 1, wherein the control packet is rebroadcast at a fixed time interval after a previous broadcast of the control packet.

9. The multicast network system of claim 1, wherein the data network is an unreliable network.

10. The multicast network system of claim 1, wherein the media source broadcasts the control packet and later broadcasts a second control packet with different format information pertaining to the media packet.

11. The multicast network system of claim 10, further comprising a media receiver coupled to the network, which receives the control packet and the media packets from the data network to process the control packet and the media packets to produce a media output, and which completes processing the second control packet before processing the media packet from the data network.

12. The multicast network system of claim 1, further comprising a media receiver coupled to the network, which receives the control packet and the media packets from the data network to process the control packet and the media packets to produce a media output, and which stores the control packet and the media packet and at a later time produces the media output signal.

* * * * *